United States Patent
Miyazaki et al.

(10) Patent No.: US 12,498,612 B2
(45) Date of Patent: Dec. 16, 2025

(54) OPTICAL MODULATOR AND OPTICAL TRANSMISSION APPARATUS

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 300 days.

(21) Appl. No.: 18/493,538

(22) Filed: Oct. 24, 2023

(65) Prior Publication Data

US 2024/0142848 A1    May 2, 2024

(30) Foreign Application Priority Data

Oct. 28, 2022   (JP) ................................. 2022-173811

(51) Int. Cl.
  *G02F 1/225*   (2006.01)
  *G02F 1/035*   (2006.01)
(52) U.S. Cl.
  CPC .......... *G02F 1/2255* (2013.01); *G02F 1/0356* (2013.01); *G02F 2201/127* (2013.01)
(58) Field of Classification Search
  CPC ...... G02F 1/2255; G02F 1/0356; G02F 1/025; G02F 2201/127
  USPC ...................................................... 385/1–3
  See application file for complete search history.

(56) References Cited

U.S. PATENT DOCUMENTS

| | | | | |
|---|---|---|---|---|
| 6,567,203 | B1 * | 5/2003 | Hill ...................... | G02F 1/2255 |
| | | | | 359/254 |
| 11,372,307 | B2 * | 6/2022 | Kikuchi ................ | G02F 1/0356 |
| 12,306,478 | B2 * | 5/2025 | Miyazaki .............. | G02F 1/0121 |
| 2020/0064707 | A1 * | 2/2020 | Vitic ..................... | G02F 1/2257 |
| 2022/0404680 | A1 * | 12/2022 | Jacques ................ | G02F 1/2255 |
| 2023/0084020 | A1 * | 3/2023 | Poulin .................... | G02F 1/025 |
| | | | | 385/2 |

FOREIGN PATENT DOCUMENTS

| JP | 2014-164243 A | 9/2014 |
|---|---|---|
| JP | 2021-140026 A | 9/2021 |

* cited by examiner

*Primary Examiner* — Robert Tavlykaev
(74) *Attorney, Agent, or Firm* — Rankin, Hill & Clark LLP

(57) ABSTRACT

An optical modulator includes an optical waveguide device including an optical waveguide and a signal electrode for controlling a light wave propagating through the optical waveguide, a drive circuit that outputs two high-frequency signals, and two termination resistors for respectively terminating the two high-frequency signals, in which one high-frequency signal among the high-frequency signals output from the drive circuit propagates through the signal electrode of the optical waveguide device and is terminated by a first termination resistor that is one of the termination resistors, an other high-frequency signal among the high-frequency signals output from the drive circuit is terminated by a second termination resistor that is an other one of the termination resistors, a resistance value of the first termination resistor is lower than a resistance value of the second termination resistor, and the signal electrode includes a plurality of sections having constant impedances different from each other.

9 Claims, 6 Drawing Sheets

MODIFICATION EXAMPLE 4

MODIFICATION EXAMPLE 5

MODIFICATION EXAMPLE 6

MODIFICATION EXAMPLE 7

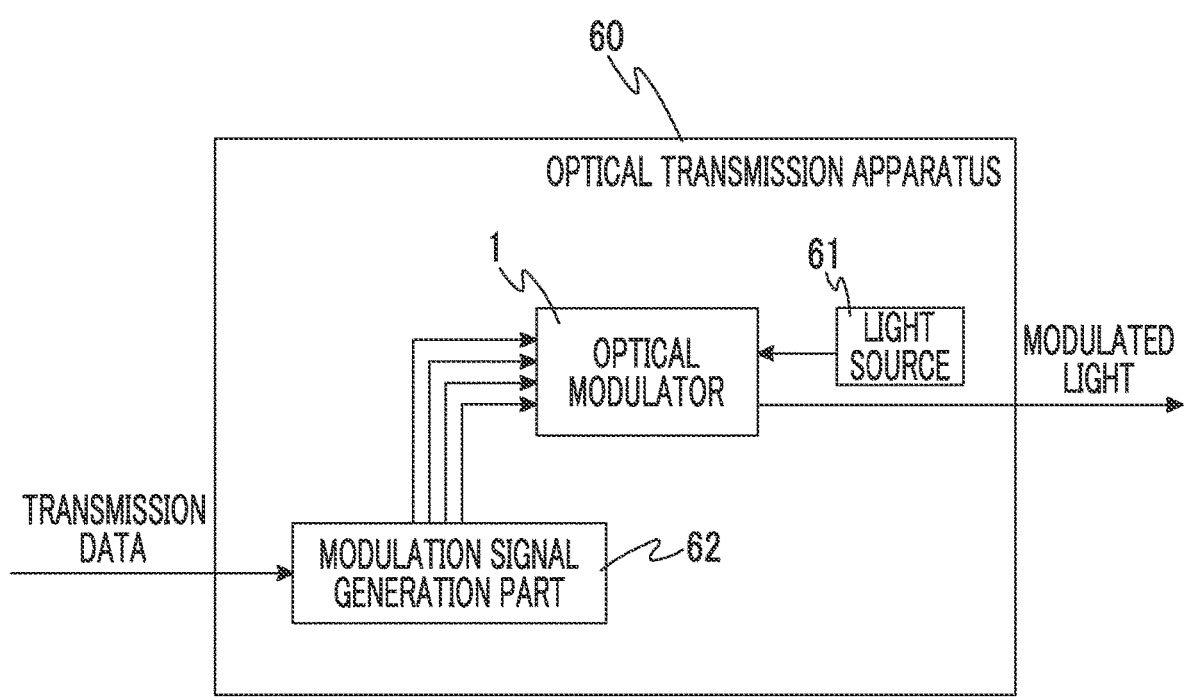
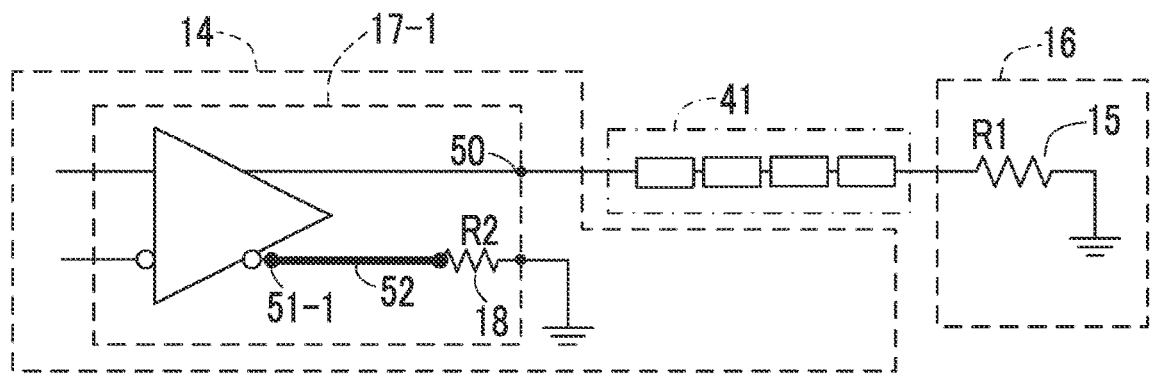

OPTICAL MODULATOR AND OPTICAL TRANSMISSION APPARATUS

CROSS-REFERENCE TO RELATED APPLICATIONS

This application claims the benefit of Japanese Patent Application No. 2022-173811 filed Oct. 28, 2022, the disclosure of which is herein incorporated by reference in its entirety.

BACKGROUND OF THE INVENTION

Field of the Invention

The present invention relates to an optical modulator and an optical transmission apparatus.

Description of Related Art

In a high-frequency and large-capacity optical fiber communication system, an optical modulator incorporating an optical modulation device as an optical waveguide device including an optical waveguide formed on a substrate and a control electrode for controlling light waves propagating in the optical waveguide is often used. As the optical waveguide devices that perform an optical modulation operation, a semiconductor optical modulation device using a semiconductor substrate such as an InP substrate and an LN optical modulation device using LiNbO3 (hereinafter, also referred to as LN) for a substrate have been put to practical use.

Japanese Laid-open Patent Publication No. 2014-164243 discloses a semiconductor optical modulation module including a semiconductor optical modulation device including a Mach-Zehnder optical waveguide. In this semiconductor optical modulation module, a standardized small-sized case called a High Bandwidth Coherent Driver Modulator (HB-CDM) is used, and each of two high-frequency electrical signals (hereinafter, referred to as high-frequency signals) configuring a pair of differential signals whose phases are inverted from each other is input to an electrode formed on each of two parallel waveguides configuring a Mach-Zehnder optical waveguide to perform an optical modulation operation. A drive circuit element (high-frequency driver) that outputs a differential signal for driving such a semiconductor optical modulation device has already been put into practical use in a form of an integrated circuit and is commercially available.

Meanwhile, since the LN optical modulation device can achieve broadband optical modulation characteristics with less optical loss as compared to the semiconductor optical modulation device, the LN optical modulation device is widely used in a high-frequency and large-capacity optical fiber communication system. However, a dedicated drive circuit element for driving the LN optical modulation device used in the HB-CDM has not yet been commercialized due to, for example, the small demand for the device. Therefore, it is convenient if the drive circuit element that has been developed for the semiconductor optical modulation module and has already been put into practical use can be used even in the optical modulator including the LN optical modulation device.

However, in the case of an LN optical modulation device particularly using an X-cut substrate as the LN substrate, as in the semiconductor optical modulation module in Japanese Laid-open Patent Publication No. 2014-164243, it is not necessary to input a pair of differential signals to the electrodes of two parallel waveguides of a Mach-Zehnder optical waveguide, and it is sufficient to input one high-frequency electrical signal to one signal electrode formed between the two parallel waveguides.

Japanese Laid-open Patent Publication No. 2021-140026 discloses an optical modulator devised to drive a Mach-Zehnder optical waveguide on an X-cut LN substrate by using both of a pair of high-frequency electrical signals that is a differential signal. In this optical modulator, the Mach-Zehnder optical waveguide is formed such that the propagation direction of the light propagating through the two parallel waveguides is curved by 180 degrees from the +Y direction to the −Y direction on the X-cut LN substrate. Then, one electrode to which one high-frequency signal of the differential signal is input is formed between two parallel waveguides of the section in which light propagates in the +Y direction, and an other electrode to which the other high-frequency signal of the differential signal is input is formed between two parallel waveguides of the section in which light propagates in the −Y direction.

However, in the optical modulator of Japanese Laid-open Patent Publication No. 2021-140026, when a high-frequency optical modulation operation in the gigahertz band is performed, it is necessary to accurately adjust the phase difference between a pair of high-frequency signals of the differential signal in accordance with the propagation time of light from the section in the +Y direction to the section in the −Y direction. Therefore, in the optical modulator of No. 2021-140026, for example, an issue may arise in that the manufacturing tolerances for the length of the electrodes from the drive circuit element to each of the ±Y sections have become extremely strict, and the optical modulation operation may become unstable due to fluctuations in the phase difference that may occur as the environmental temperature changes.

That is, when the Mach-Zehnder optical waveguide is driven on the X-cut LN substrate, in terms of ease of manufacture and stability of modulation operation, it is preferable to use only one high-frequency signal of the differential signal. In such an optical modulation device that does not use a differential signal, when using a drive circuit element that outputs a differential signal as described above, it is necessary to connect the output terminal of one high-frequency signal configuring the differential signal to the signal electrode, and treat the output terminal of the other high-frequency signal by appropriate means.

In this case, the power of the high-frequency signal output from the other output terminal is wasted power that does not contribute to optical modulation, and the overall power consumption of the drive circuit element may become inefficient. In addition, in order to improve the efficiency of the power consumption, for example, when an impedance of the signal electrode connected to the one output terminal is reduced, depending on the configuration of the signal electrodes and how the other output terminal is treated, the operation of the drive circuit element may become unstable due to signal reflection at the termination resistor or the like connected to each output terminal.

SUMMARY OF THE INVENTION

From the above background, an object of the present invention is to provide an optical modulator which drives an optical modulation device by using a part of the signal output of a drive circuit that outputs a plurality of signals such as a differential signal, in which power consumption can be reduced and/or a size of the optical modulator can be reduced while avoiding operation instability.

According to an aspect of the present invention, there is provided an optical modulator including: an optical waveguide device including an optical waveguide formed on a substrate and a signal electrode for controlling a light wave propagating through the optical waveguide; a drive circuit that outputs two high-frequency signals; and two termination resistors for respectively terminating the two high-frequency signals output from the drive circuit, in which one high-frequency signal out of the high-frequency signals output from the drive circuit propagates through the signal electrode of the optical waveguide device and is terminated by a first termination resistor that is one of the termination resistors, an other high-frequency signal out of the high-frequency signals output from the drive circuit is terminated by a second termination resistor that is an other one of the termination resistors, a resistance value of the first termination resistor is lower than a resistance value of the second termination resistor, and the signal electrode includes a plurality of sections having constant impedances different from each other.

According to another aspect of the present invention, the signal electrode includes at least three of the sections disposed such that impedances stepwise decrease along a propagation direction of the high-frequency signals of the signal electrode.

According to another aspect of the present invention, at least one of the sections includes an action portion in which the high-frequency signal acts on the light wave propagating through the optical waveguide, and the section including the action portion is a lowest impedance section having a lowest impedance among the plurality of sections.

According to another aspect of the present invention, a first electrical length of a lowest impedance section in a frequency band of the high-frequency signal, the lowest impedance section being a section having a lowest impedance among the plurality of sections, is longer than a second electrical length from a second output port that outputs the other high-frequency signal of the drive circuit to the second termination resistor in the frequency band.

According to another aspect of the present invention, the first electrical length of the lowest impedance section is longest among respective electrical lengths of the plurality of sections in the frequency band.

According to another aspect of the present invention, an attenuation portion that attenuates the high-frequency signal is provided between the drive circuit and the second termination resistor.

According to another aspect of the present invention, a second electrical length from a second output port that outputs the other high-frequency signal of the drive circuit to the second termination resistor in a frequency band of the high-frequency signal is at least twice as long as a third electrical length from a first output port that outputs the one high-frequency signal of the drive circuit to the first termination resistor in the frequency band.

According to another aspect of the present invention, an absolute value of a difference between a third electrical length L1 from a first output port that outputs the one high-frequency signal of the drive circuit to the first termination resistor in a frequency band of the high-frequency signal and a second electrical length L2 from a second output port that outputs the other high-frequency signal of the drive circuit to the second termination resistor in the frequency band of the high-frequency signal has a relationship of $|L1-L2|>\lambda/2$ with respect to an average wavelength $\lambda$ of the high-frequency signal.

According to another aspect of the present invention, there is provided optical transmission apparatus including any one of the optical modulators described above, and an electronic circuit that generates a modulation signal which is a high-frequency signal for causing the optical waveguide device to perform a modulation operation.

According to the present invention, there is provided an optical modulator which drives an optical modulation device by using a part of the signal output of a drive circuit that outputs a plurality of signals such as a differential signal, in which power consumption can be reduced and/or a size of the optical modulator can be reduced while avoiding operation instability.

BRIEF DESCRIPTION OF THE DRAWINGS

FIG. 9 is a diagram illustrating a configuration of an optical transmission apparatus according to a second embodiment of the present invention.

FIG. 10 is a diagram illustrating an example in which a second termination resistor is provided in a drive circuit element.

DETAILED DESCRIPTION OF THE INVENTION

Hereinafter, embodiments of the present invention will be described with reference to the drawings.

1. First Embodiment

Figure 1:
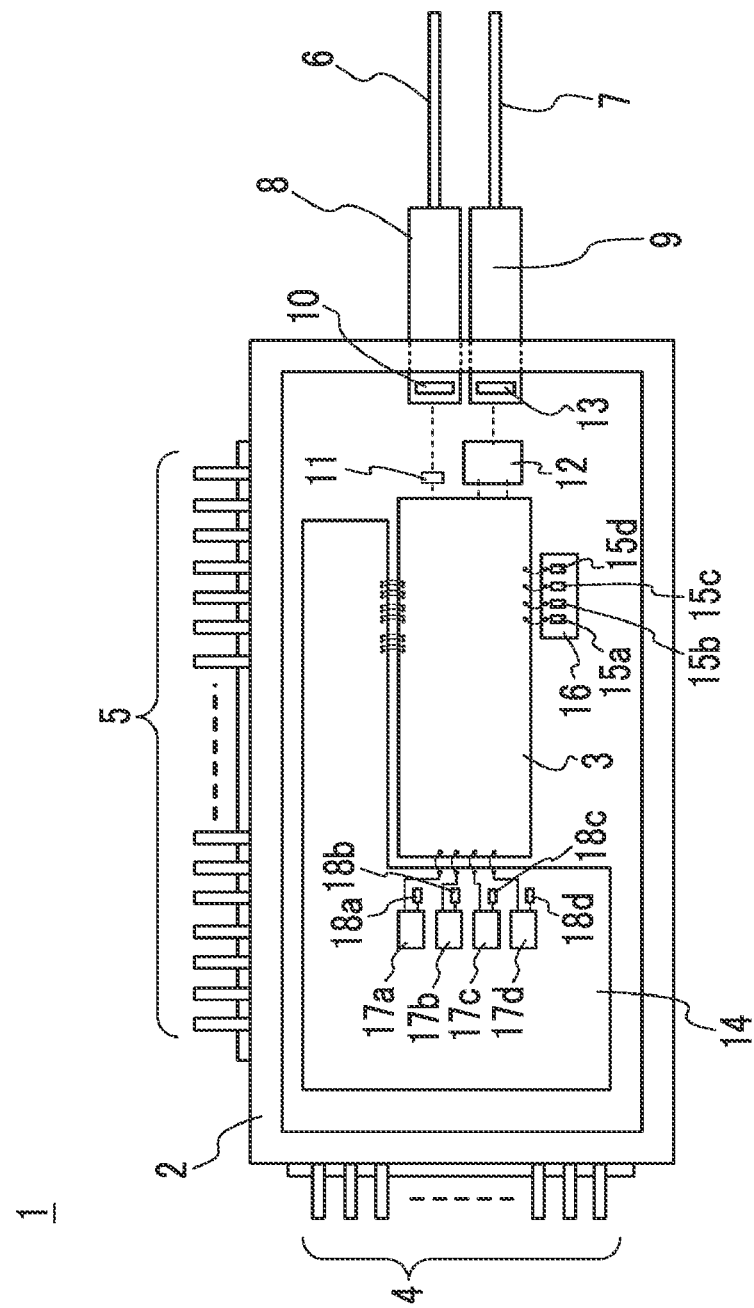
FIG. 1 is a diagram illustrating a configuration of an optical modulator according to a first embodiment of the present invention.

First, a first embodiment of the present invention will be described. FIG. 1 is a diagram illustrating a configuration of an optical modulator 1 using an optical modulation device, which is an optical waveguide device according to a first embodiment of the present invention.

The optical modulator 1 includes a case 2, and an optical modulation device 3 housed in the case 2. The optical modulation device 3 is, for example, a configuration of a DP-QPSK modulator. The case 2 complies with, for example, the HB-CDM standard, which is an industry standard ("Implementation Agreement for the High Bandwidth Coherent Driver Modulator (HB-CDM) OIF-HB-CDM-02.0" (Jul. 15, 2021, published by OIF)).

The inside of the case 2 is finally hermetically sealed with a plate-shaped cover (not shown) fixed to an opening portion of the case 2.

In the case 2, signal pins 4 for receiving a high-frequency electrical signal used for modulation of the optical modulation device 3, and signal pins 5 for receiving an electrical signal used for adjusting the operating point of the optical modulation device 3 are provided. In the following description, impedance and resistance values are regarded as referring to impedance and resistance values at a frequency of the high-frequency electrical signal used for modulation of the optical modulation device 3, respectively.

The optical modulator 1 includes an input optical fiber 6 for inputting light into the case 2 and an output optical fiber 7 for guiding the light modulated by the optical modulation device 3 to the outside of the case 2 on the same surface of the case 2.

The input optical fiber 6 and the output optical fiber 7 are fixed to the case 2 via the supports 8 and 9 which are fixing members, respectively. The light input from the input optical fiber 6 is collimated by the lens 10 disposed in the support 8, and then input to the optical modulation device 3 through the lens 11. However, this is only an example, and the input of light to the optical modulation device 3 may be performed by introducing, for example, the input optical fiber 6 into the case 2 via the support 8, and connecting the end face of the introduced input optical fiber 6 to the end face of the substrate 30 (described later) of the optical modulation device 3, according to the related art.

The optical modulator 1 also has an optical unit 12 that performs polarization synthesis of two beams of modulated light that is output from the optical modulation device 3. The light after polarization synthesis, output from the optical unit 12, is condensed by the lens 13 disposed in the support 9 and coupled to the output optical fiber 7.

A relay substrate 14 and a terminator 16 including four first termination resistors 15a, 15b, 15c, and 15d having a predetermined impedance are disposed in the case 2 of the optical modulator 1. Hereinafter, the first termination resistors 15a, 15b, 15c, and 15d are collectively referred to as first termination resistors 15.

The relay substrate 14 is equipped with four drive circuit elements 17a, 17b, 17c, and 17d that respectively drive four signal electrodes 41 (described later) provided in the four Mach-Zehnder optical waveguides of the optical modulation device 3. Hereinafter, the drive circuit elements 17a, 17b, 17c, and 17d are collectively referred to as drive circuit elements 17. The drive circuit element 17 is mounted on the relay substrate 14 in the form of an integrated circuit, for example.

The drive circuit element 17 is a two-signal-input and two-signal-output type amplifier circuit that amplifies a differential signal, which is two high-frequency electrical signals (hereinafter, referred to as high-frequency signals) with phases inverted from each other (that is, the phases shifted by 180 degrees), and outputs two amplified differential signals. Four (that is, four pairs of) differential signals to be respectively input to the four drive circuit elements 17 are given from an external apparatus via, for example, the signal pins 4. Here, the high-frequency signals configuring the differential signal are, for example, electrical signals in the microwave band, and are electrical signals containing signal components of, for example, the G-band frequency or higher specified in the IEEE standard, specifically, 0.2 GHz or higher.

In addition, the relay substrate 14 is mounted with four second termination resistors 18a, 18b, 18c, and 18d which are connected to the second output ports 51a, 51b, 51c, and 51d of the drive circuit element 17 through conductor patterns on the relay substrate 14, respectively. Hereinafter, the second termination resistors 18a, 18b, 18c, and 18d are collectively referred to as second termination resistors 18.

One of the two high-frequency signals which are differential signals output by the drive circuit element 17 is input to the signal electrode 41 of the optical modulation device 3, propagates through the signal electrode 41, and then, is terminated by the first termination resistor 15. The other high-frequency signal of the two high-frequency signals which are differential signals output by the drive circuit element 17 is terminated by the second termination resistor 18 mounted on the relay substrate 14.

The electrical connection between the optical modulation device 3, and the relay substrate 14 and the terminator 16 is performed by, for example, wire bonding or the like.

Figure 2:
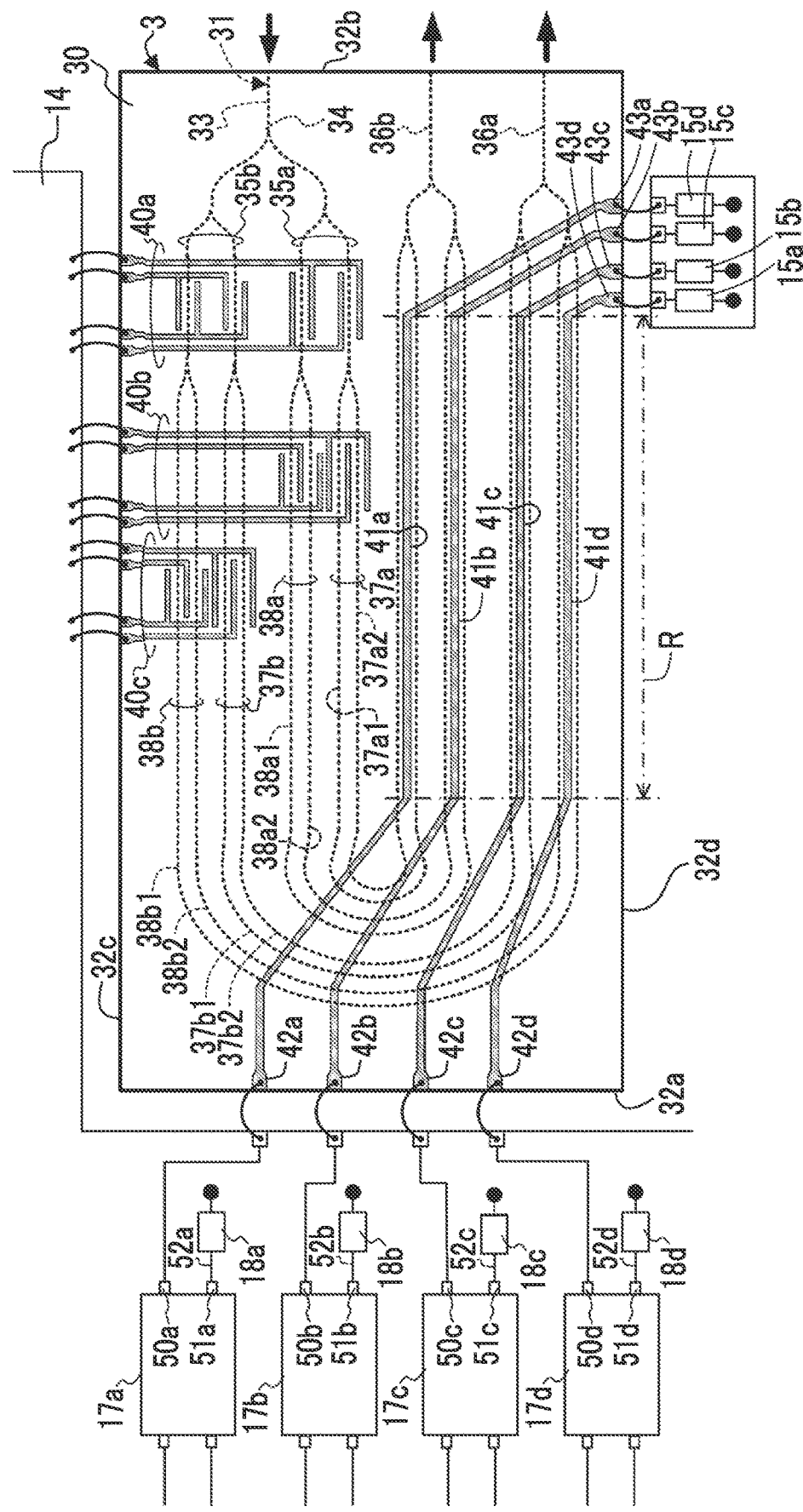
FIG. 2 is a diagram illustrating a configuration of an optical modulation device used in the optical modulator illustrated in FIG. 1.

FIG. 2 is a diagram illustrating an example of a configuration of the optical modulation device 3, which is a DP-QPSK modulator. FIG. 2 also shows a part of the relay substrate 14 and a terminator 16.

The optical modulation device 3 is formed of an optical waveguide 31 (the shown entire bold dotted line) formed on a substrate 30, and performs, for example, 200 G DP-QPSK modulation. The substrate 30 is, for example, a thinned X-cut LN substrate having an electro-optic effect, which is processed to a thickness of 20 μm or lower (for example, 2 μm). The optical waveguide 31 is a convex optical waveguide (for example, a rib-type optical waveguide or a ridge optical waveguide) including a strip-shaped extending protruding portion formed on the surface of the thinned substrate 30. Here, since in the LN substrate, the refractive index can locally change due to the photoelastic effect when stress is applied, the LN substrate is generally adhered to a silicon (Si) substrate, a glass substrate, an LN supporting plate, or the like in order to reinforce the mechanical strength of the entire substrate.

The substrate 30 is, for example, rectangular and has two left and right sides 32a and 32b extending in the vertical direction and facing each other, and upper and lower sides 32c and 32d extending in the left and right direction and facing each other, in the drawing.

The optical waveguide 31 includes an input waveguide 33 that receives the input light (arrow pointing to the right) from the input optical fiber 6 on the upper side of the right side 32b of the substrate 30, and a branched waveguide 34 that branches the input light into two light beams having the same light amount, in the drawing. Further, the optical waveguide 31 includes a so-called nested Mach-Zehnder optical waveguides 35a and 35b, which are two modulation parts for modulating each light branched by the branched waveguide 34.

In the nested Mach-Zehnder optical waveguides 35a and 35b, the light propagation direction is folded back by 180 degrees in the left portion of the substrate 30, and the light is output from the side 32b of the substrate 30 to the right by the output waveguides 36a and 36b, in the drawing.

The nested Mach-Zehnder optical waveguides 35a and 35b respectively include two Mach-Zehnder optical waveguides 37a, 38a and 37b, 38b respectively provided in two waveguide parts forming a pair of parallel waveguides.

The Mach-Zehnder optical waveguide 37a includes two parallel waveguides 37a1 and 37a2, and the Mach-Zehnder optical waveguide 38a includes two parallel waveguides 38a1 and 38a2. Further, the Mach-Zehnder optical waveguide 37b includes two parallel waveguides 37b1 and 37b2, and the Mach-Zehnder optical waveguide 38b includes two parallel waveguides 38b1 and 38b2.

In the upper portion of the nested Mach-Zehnder optical waveguides 35a and 35b folded back on the left portion on the substrate 30, bias electrodes 40a, 40b, and 40c for adjusting the operating point by compensating for bias point fluctuations due to so-called DC drift of the nested Mach-Zehnder optical waveguides 35a and 35b and four Mach-Zehnder optical waveguides 37a, 38a, 37b, and 38b are provided. The bias electrodes 40a, 40b, and 40c are connected to the signal pins 5 of the case 2 via wire bonding and a conductor pattern (not illustrated) of the relay substrate 14.

In addition, in the lower part of the substrate 30, signal electrodes 41a, 41b, 41c, and 41d for causing a total of four Mach-Zehnder optical waveguides 37a, 38a, 37b, and 38b configuring the nested Mach-Zehnder optical waveguides 35a and 35b to perform modulation operations are provided. Hereinafter, the signal electrodes 41a, 41b, 41c, and 41d are collectively referred to as signal electrodes 41.

The left sides of the signal electrodes 41a, 41b, 41c, and 41d extend to the left side 32a of the substrate 30 and are connected to the pads 42a, 42b, 42c, and 42d, respectively. Further, the right sides of the signal electrodes 41a, 41b, 41c, and 41d are bent downward to extend to the side 32d of the substrate 30, and are connected to the pads 43a, 43b, 43c, and 43d.

The signal electrodes 41a, 41b, 41c, and 41d are disposed between the parallel waveguides of the Mach-Zehnder optical waveguides 37a, 38a, 37b, and 38b, respectively, in a region R indicated by a dashed-dotted line in the drawing, and control light waves propagating through the parallel waveguides.

Further, the signal electrodes 41a, 41b, 41c, and 41d form, for example, a coplanar transmission line having a predetermined impedance together with a ground conductor pattern (not illustrated) formed on the substrate 30, according to the related art. The ground conductor pattern is provided so as not to be formed on, for example, the optical waveguide 31, and the plurality of regions formed by dividing the ground conductor pattern by the optical waveguide 31 can be connected to each other by, for example, wire bonding or the like.

The pads 42a, 42b, 42c, and 42d on the left side of the signal electrodes 41a, 41b, 41c, and 41d are connected to the first output ports 50a, 50b, 50c, and 50d that are output terminals for one high-frequency signal configuring the differential signal of each of the drive circuit elements 17a, 17b, 17c, and 17d, via the wires bonded to these pads and conductor patterns on the relay substrate 14. Further, the pads 43a, 43b, 43c, and 43d on the lower right side of the signal electrodes 41a, 41b, 41c, and 41d are connected to one ends of the first termination resistors 15a, 15b, 15c, and 15d in the terminator 16 via bonding wires. The other ends of the first termination resistors 15a, 15b, 15c, and 15d are connected to, for example, ground lines (not shown) provided on a substrate configuring the terminator 16.

On the other hand, the second output ports 51a, 51b, 51c, and 51d, which are output terminals of the other high-frequency signal configuring the differential signal of the drive circuit elements 17a, 17b, 17c, and 17d, respectively, are connected to one ends of the second termination resistors 18a, 18b, 18c, and 18d mounted on the relay substrate 14 through the high-frequency transmission channels 52a, 52b, 52c, and 52d which are conductor patterns on the relay substrate 14. Further, the other ends of the second termination resistors 18a, 18b, 18c, and 18d are connected to a ground pattern (not shown) provided on the relay substrate 14.

Hereinafter, the high-frequency transmission channels 52a, 52b, 52c, and 52d are collectively referred to as high-frequency transmission channels 52. Further, the first output ports 50a, 50b, 50c, and 50d of the drive circuit elements 17a, 17b, 17c, and 17d are collectively referred to as first output ports 50, and the second output ports 51a, 51b, 51c, and 51d are collectively referred to as second output ports 51. Here, the drive circuit element 17 corresponds to a drive circuit in the present disclosure.

In the driver circuit element 17, for example, line impedances that are output impedances measured between each of the first output port 50 and the second output port 51, which are output ports of two high-frequency signals configuring the differential signal, and a ground potential have values Zlin that are equal to each other. This line impedance Zlin is, for example, 50Ω. Further, the differential impedance Zdif that is an output impedance of the drive circuit element 17, measured between the first output port 50 and the second output port 51 of the differential signal is 100Ω (see FIG. 4 or the like).

In the optical modulator 1 having the above-described configuration, one high-frequency signal output from the first output port 50 of the drive circuit element 17 that outputs the amplified differential signal propagates through the corresponding signal electrode 41, and then, is terminated by the first termination resistor 15. Further, the high-frequency signal output from the other second output port 51 of the drive circuit element 17 is terminated by the corresponding second termination resistor 18 mounted on the relay substrate 14.

In addition, the resistance value R1 of the first termination resistor 15 that terminates one high-frequency signal that has been output from one first output port 50 of the drive circuit element 17 and propagated through the signal electrode 41 is smaller than the resistance value R2 of the second termination resistor 18 that terminates the other high-frequency signal output from the other second output port 51 of the drive circuit element 17. That is, the resistance value R1 of the first termination resistor 15 and the resistance value R2 of the second termination resistor 18 satisfy the following Equation (1).

$$R2 > R1 \qquad (1)$$

In this way, in the optical modulator 1, since the resistance value R1 of the first termination resistor 15 is smaller than the resistance value R2 of the second termination resistor 18, the high-frequency signal power output from the first output port 50 of the drive circuit element 17 to the first termination resistor 15 through the signal electrode 41 is larger than the high-frequency signal power output from the second output port 51 to the second termination resistor 18. Therefore, the ratio of the high-frequency signal power supplied to the signal electrode 41 with respect to the power consumption of the drive circuit element 17 is increased, and thus the power efficiency of the drive circuit element 17 in the optical modulator 1 is improved. As a result, the power consumption of the drive circuit element 17 necessary to secure the high-frequency signal power required for the signal electrode 41 is reduced. In addition, as a result of reducing power consumption as described above, a size of the optical modulator 1 can be downsized.

The resistance value R2 of the second termination resistor 18 is set to, for example, 50Ω, which is the same as the line impedance Zlin of the drive circuit element 17, and the resistance value R1 of the first termination resistor 15 is set to a value less than 50Ω that is lower than the resistance value R2. In this case, the resistance value R1 of the first termination resistor 15 is preferably 45Ω or lower, and more preferably 40Ω or lower.

However, as described above, in a case where the value of the resistance value R1 of the first termination resistor 15 is set to a value different from the line impedance Zlin of the drive circuit element 17, an impedance change point or a discontinuity point (hereinafter, collectively referred to as an impedance discontinuity point) may occur along the way to the first termination resistor 15 from the first output port 50 of the drive circuit element 17. At such an impedance discontinuity point, reflection of the high-frequency signal output from the drive circuit element 17 occurs, and a reflected wave of the high-frequency signal (reflected high-frequency signal) propagates in a direction of the drive circuit element 17.

When the reflected high-frequency signal as described above is back to the first output port 50 of the drive circuit element 17, the operation of the drive circuit element 17 may become unstable depending on a size (signal power) of the reflected high-frequency signal. Generally, when a high-frequency signal is reflected, the larger the impedance change width at the impedance discontinuity point, the larger the reflected high-frequency signal is generated, which can have a greater influence on the operation of the drive circuit element 17.

In order to avoid such unstable operation of the drive circuit element 17, in the present embodiment, particularly, the signal electrode 41 is configured to include a plurality of sections having impedances different from each other.

Figure 3:
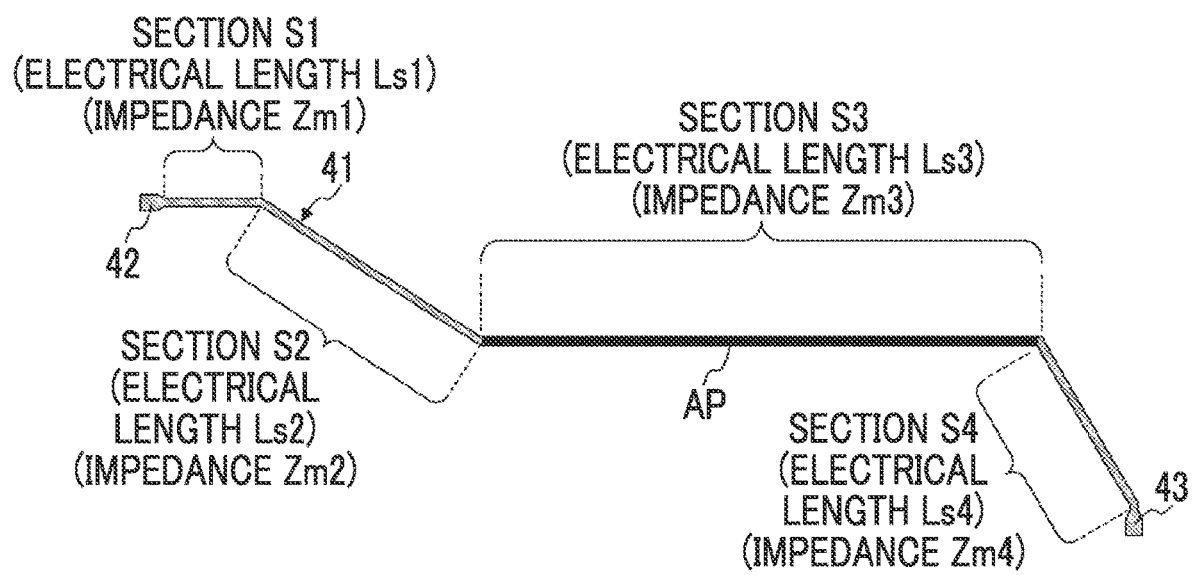
FIG. 3 is an explanatory diagram for explaining a configuration of a signal electrode.
Figure 4:
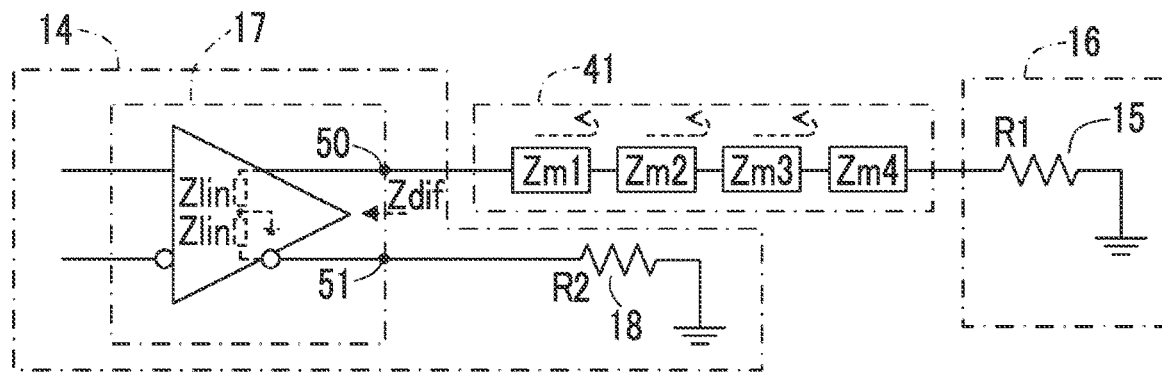
FIG. 4 is a circuit diagram of an electric circuit including a drive circuit element, a signal electrode, and a termination resistor.

FIG. 3 is an explanatory diagram for explaining a configuration of the signal electrode 41. Further, FIG. 4 is a circuit diagram of an electric circuit including the drive circuit element 17, the signal electrode 41, the first termination resistor 15, and the second termination resistor.

Each of the signal electrodes 41a, 41b, 41c, and 41d is configured in the same manner as the signal electrode 41 shown in FIG. 3.

As shown in FIG. 3, the signal electrode 41 includes an action portion AP (shown black part) which is a part in the region R shown in FIG. 2. The action portion AP is a part in which the high-frequency signal propagating through the signal electrode 41 acts on light waves propagating through the optical waveguide 31 (specifically, light waves propagating through the parallel waveguides of each of the corresponding Mach-Zehnder optical waveguides 37a, 38a, 37b, and 38b).

The signal electrode 41 includes four sections of sections S1, S2, S3, and S4. The section S3 includes the action portion AP. That is, the length of the section S3 is set to a length equal to or greater than the length of the action portion AP.

The section S1 is a section started from a pad 42 to which a high-frequency signal is input, and the section S2 is an intermediate section connecting the section S1 and the section S3. Here, the boundary position between the section S1 and the section S2 can be arbitrarily determined based on, for example, design requirements or the like. The section S4 is an output section from the section S3 to the pad 43 connected to the first termination resistor 15. Hereinafter, the sections S1, S2, S3, and S4 are collectively referred to as sections S.

The sections S1, S2, S3, and S4 have constant impedances different from each other. Here, having a "constant" impedance means that the characteristic impedance with respect to the high-frequency signal in the section is constant regardless of the position in the section. Therefore, for example, a region of the signal electrode where the specific impedance changes depending on the position in the length direction due to the width of the signal electrode changing along the length direction of the signal electrode, or the like is not a section with constant impedance. It may be understood that such a region includes, for example, a plurality of sections each of which has a constant width of the signal electrode and has a constant impedance.

The sections S1, S2, S3, and S4 in the frequency band of the high-frequency signal propagating in the signal electrode 41 have the electrical lengths of Ls1, Ls2, Ls3, and Ls4, and the impedances are Zm1, Zm2, Zm3, and Zm4, respectively.

In the present embodiment, the three sections of the sections S1, S2, and S3 are disposed such that the impedances stepwise decrease along the propagation direction of the high-frequency signals propagating through the signal electrode 41. Further, the section S4 is configured to have an impedance larger than the impedance of the section S3.

The impedance of the section S1 is set to be equal to or lower than the line impedance Zlin of the drive circuit element 17, for example, and the impedance of the section S4 is set to a value within a predetermined range including, for example, the resistance value R1 of the first termination resistor 15.

That is, the impedances Zm1, Zm2, Zm3, and Zm4, which the sections S1, S2, S3, and S4 respectively have, have a relationship of Equation (2).

$$Zm1 > Zm2 > Zm3, \text{ and } Zm3 < Zm4 \quad (2)$$

In the optical modulator 1 according to the above-described embodiment, since the signal electrode 41 includes four sections S1, S2, S3, and S4 having constant impedances different from each other, the signal electrodes 41 has three impedance discontinuity points generated between the adjacent sections. Therefore, for example, since the change in impedance from Zlin to R1 can be stepwise distributed to the three discontinuity points, it is possible to reduce the size of the reflected high-frequency signal (indicated by the dashed-dotted line arrow in FIG. 4) generated at each discontinuity point. Therefore, in the optical modulator 1, the resistance value R1 of the first termination resistor 15 and the resistance value R2 of the second termination resistor 18 satisfy the above-described Equation (1), thereby reducing power consumption while avoiding operation instability of the drive circuit element 17. As a result, in the optical modulator 1, the size can be reduced by reducing the power consumption of the optical modulator while ensuring the stable operation of the optical modulation operation.

As in the present embodiment, the signal electrode 41 preferably includes at least three sections disposed such that the impedances stepwise decrease along the propagation direction of the high-frequency signals.

Thus, in the signal electrode 41, at least two impedance discontinuity points for changing the impedance in the decreasing direction are secured, and reflection of a high-frequency signal that may occur due to a change in the decreasing direction of the impedance is distributed to two locations, so that the size of a reflected high-frequency signal generated at each impedance discontinuity point can be reduced.

The impedance of each section included in the signal electrode 41 can be set to a desired value by adjusting the width and/or thickness of the signal electrode 41 and/or a separation distance between a ground electrode (not shown)

adjacent to the signal electrode 41 and the signal electrode 41, and the like, according to the related art.

Here, the length of each of the plurality of sections included in the signal electrode 41 can be set to any length. However, from a viewpoint of optical modulation operation, it is preferable that the action portion AP is included in one section having a constant impedance.

In addition, in the present embodiment, the action portion AP is included in the section S3 that is the lowest impedance section having the lowest impedance among the plurality of sections included in the signal electrode 41, but may be included in other sections. However, by configuring the action portion AP to be included in the lowest impedance section as in the present embodiment, the interaction between the light wave propagating through the optical waveguide 31 and the high-frequency signal propagating through the signal electrode 41 can be further strengthened, and thus it is possible to further reduce the driving power required to cause the optical modulation device 3 to perform the optical modulation operation.

2. Modification Example of First Embodiment

Next, modification examples of the optical modulator 1 according to the first embodiment will be described.

2-1. Modification Example 1

The number of sections included in the signal electrode 41 disposed such that the impedances stepwise decrease along the propagation direction of the high-frequency signals can be at least three as described above, that is, the number of three or more. Along an increase in the number of sections disposed such that the impedances stepwise decrease, reflection of the high-frequency signal can be distributed to more discontinuity points, so that the size of the reflected high-frequency signal generated at each discontinuity point can be reduced.

For example, in the present embodiment, the impedance of the section S4 is higher than the impedance of the section S3, but all the four sections of the sections S1, S2, S3, and S4 may be disposed such that the impedances stepwise decrease along the propagation direction of the high-frequency signals. That is, the impedances Zm1, Zm2, Zm3, and Zm4 of the sections S1, S2, S3, and S4 can satisfy the following Equation (3) instead of Equation (2).

$$Zm1>Zm2>Zm3>Zm4 \qquad (3)$$

2-2. Modification Example 2

The action portion AP of the signal electrode 41 does not necessarily need to be included in the end section S3 out of the three sections disposed such that the impedances stepwise decrease as in the above embodiment, and may be configured to be included in other sections.

2-3. Modification Example 3

In general, in a two-input and two-output type amplifier circuit, such as the drive circuit element 17 that amplifies and outputs a differential signal, when the phases and intensities of the two reflected high-frequency signals which are respectively input to the two output ports of the first output port 50 and the second output port 51 are the same, the circuit operation may be significantly affected by interference between the reflected high-frequency signals.

Therefore, the first electrical length that is an electrical length of a lowest impedance section which is a section having the lowest impedance among the plurality of sections included in the signal electrode 41 in the frequency band of the high-frequency signal propagating through the signal electrode 41 is preferably the longest among the respective electrical lengths of the plurality of sections in the frequency band.

For example, an electrical length Ls3 (corresponding to the first electrical length) of the section S3 that is the lowest impedance section has a relationship of the following Equation (4) with respect to electrical lengths Ls1, Ls2, and Ls4 of the other sections S1, S2, and S4.

$$Ls3>Ls1, Ls3>Ls2, \text{ and } Ls3>Ls4 \qquad (4)$$

Thus, with respect to the reflected high-frequency signal which is generated at the impedance discontinuity point at the downstream end portion of the section S3 and is likely to be input to the first output port 50 of the drive circuit element 17 with the largest signal power, the phase of the reflected high-frequency signal input to the first output port 50 of the drive circuit element 17 is largely shifted from the phase of the reflected high-frequency signal that is input to the second output port 51 (for example, a reflected high-frequency signal generated at the second termination resistor 18), compared to the reflected high-frequency signal generated at another impedance discontinuity point (that is, a connection point between two other adjacent sections) at the upstream from the downstream end portion. Therefore, in the present modification example, operation instability of the drive circuit element 17 can be effectively reduced.

2-4. Modification Example 4

The first electrical length that is an electrical length of a lowest impedance section which is a section having the lowest impedance among the plurality of sections included in the signal electrode 41 in the frequency band of the high-frequency signal propagating through the signal electrode 41 may be longer than the second electrical length that is an electrical length of the high-frequency transmission channel from the second output port 51 of the drive circuit element 17 to the second termination resistor 18 in the frequency band.

Figure 5:
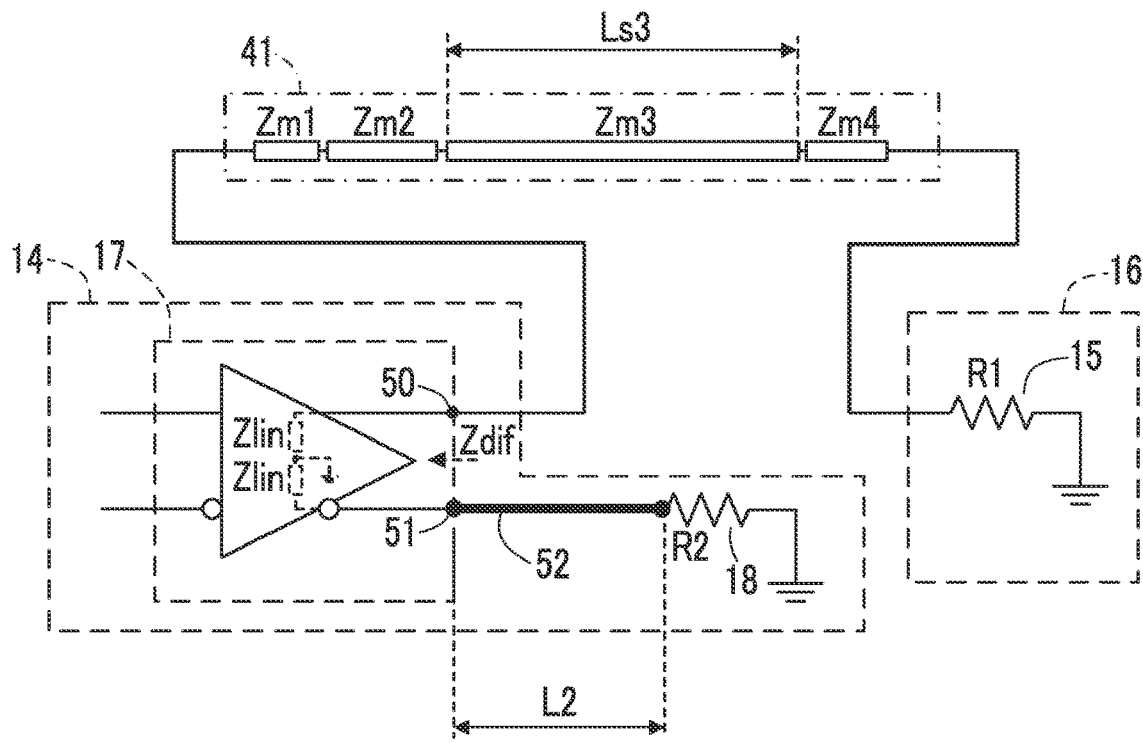
FIG. 5 is a diagram illustrating Modification Example 4 of the first embodiment.

FIG. 5 is an explanatory diagram for explaining a relationship of electrical lengths in the present modification example. In the present modification example, for example, an electrical length Ls3 (corresponding to the first electrical length) of the section S3 that is the lowest impedance section is set to be longer than the electrical length L2 (corresponding to the second electrical length) of the high-frequency transmission channel 52 (the thick line portion in the drawing) from the second output port 51 of the drive circuit element 17 to the second termination resistor 18.

In this way, with respect to the reflected high-frequency signal generated at the impedance discontinuity point at the downstream end portion of the section S3 that is the lowest impedance section, the phase when the reflected high-frequency signal input to the first output port 50 of the drive circuit element 17 is shifted from the phase of the reflected high-frequency signal that is generated at the second termination resistor 18 and is input to the second output port 51. As a result, in the present modification example, operation instability of the drive circuit element 17 can be effectively reduced.

2-5. Modification Example 5

Figure 6:
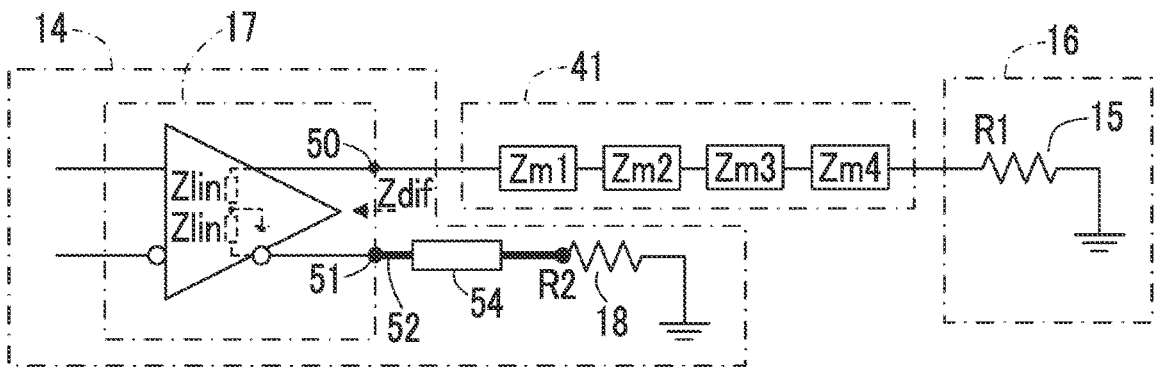
FIG. 6 is a diagram illustrating Modification Example 5 of the first embodiment.

An attenuation portion that attenuates a high-frequency signal may be provided between the second output port 51 of the drive circuit element 17 and the second termination resistor 18. FIG. 6 is a diagram illustrating an equivalent circuit of the optical modulator 1 according to the present modification example. An attenuation portion 54 that attenuates the high-frequency signal is provided in the high-frequency transmission channel 52 between the second output port 51 of the drive circuit element 17 and the second termination resistor 18. The attenuation portion 54 may be, for example, a frequency filter circuit composed of a sheet or an adhesive containing a ferrite material or the like loaded on the high-frequency transmission channel 52 from the second output port 51 to the second termination resistor 18, or electronic components such as a capacitor and a resistor that are inserted in the high-frequency transmission channel 52.

According to the above configuration, the reflected high-frequency signal generated in the second termination resistor 18 is attenuated by the attenuation portion 54 before reaching the second output port 51, so that the operation instability of the drive circuit element 17 can be reduced.

2-6. Modification Example 6

The second electrical length that is an electrical length of the high-frequency transmission channel 52 from the second output port 51 of the drive circuit element 17 to the second termination resistor 18 in a frequency band of the high-frequency signal output by the drive circuit element 17 may be at least twice as long as the third electrical length that is an electrical length from the first output port 50 of the drive circuit element 17 to the first termination resistor 15 in the frequency band.

Figure 7:
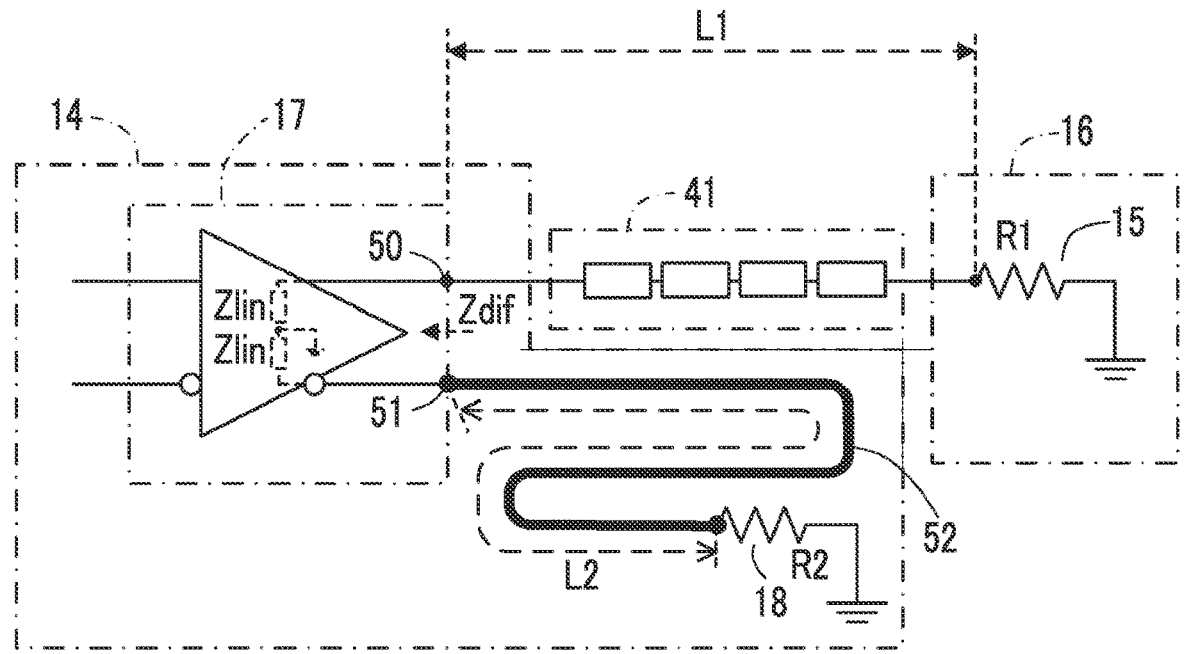
FIG. 7 is a diagram illustrating Modification Example 6 of the first embodiment.

FIG. 7 is an explanatory diagram for explaining a relationship of electrical lengths in the present modification example. In the present modification example, the electrical length L2 (corresponding to the second electrical length) of the high-frequency transmission channel 52 from the second output port 51 of the drive circuit element 17 to the second termination resistor 18 is at least twice as long as the electrical length L1 (corresponding to the third electrical length) from the first output port 50 of the drive circuit element 17 to the first termination resistor 15 in the frequency band. Such a high-frequency transmission channel 52 can be formed as a meandering conductor pattern on the relay substrate 14, for example.

According to the above configuration, since the phase of the reflected high-frequency signal generated in the second termination resistor 18 and back to the second output port 51 is shifted more than twice with respect to the phase of the reflected high-frequency signal generated in the first termination resistor 15 and back to the first output port 50, the operation instability of the drive circuit element 17 due to interference of these reflected high-frequency signals inside the drive circuit element 17 can be reduced.

2-7. Modification Example 7

The absolute value of a difference between the third electrical length that is an electrical length from the first output port 50 of the drive circuit element 17 to the first termination resistor 15 in the frequency band of the high-frequency signal output from the drive circuit element 17 and the second electrical length that is an electrical length from the second output port 51 of the drive circuit element 17 to the second termination resistor 18 in the frequency band may have a relationship of the following Equation (5) with respect to the average wavelength λ of the high-frequency signal.

$$|L1-L2|>\lambda/2 \quad (5)$$

Figure 8:
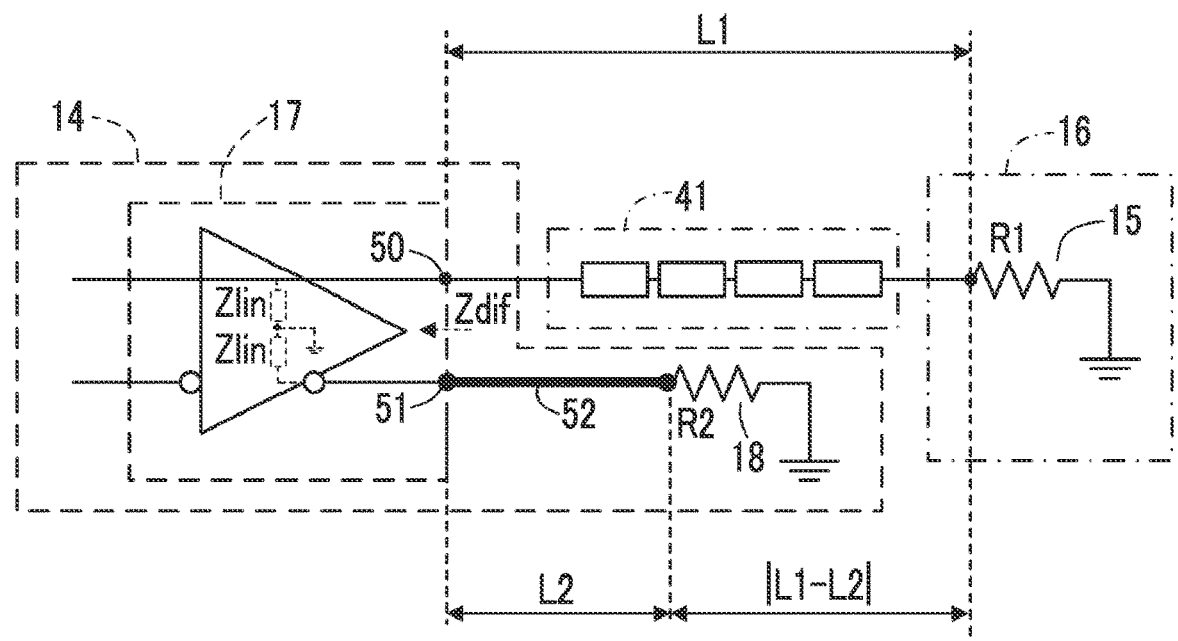
FIG. 8 is a diagram illustrating Modification Example 7 of the first embodiment.

FIG. 8 is an explanatory diagram for explaining a relationship of electrical lengths in the present modification example. In the present modification example, an absolute value |L1−L2| of the difference between the electrical length L1 (corresponding to the third electrical length) from the first output port 50 of the drive circuit element 17 to the first termination resistor 15 in the frequency band of the high-frequency signal and the electrical length L2 (corresponding to the second electrical length) from the second output port 51 of the drive circuit element 17 to the second termination resistor 18 in the frequency band is set to be greater than λ/2.

The two reflected electrical signals strongly interfere with each other when the difference in the electrical lengths |L1−L2| is an integral multiple (n times) of λ/2, interfere the most when n=1, and have a large effect on the high-frequency driver circuit. On the other hand, electrical signals have a loss during signal line propagation, in particular, reflected electrical signals have twice as much propagation loss by reciprocating a signal line leading to a reflection point.

Therefore, by making the difference |L1−L2| between electrical lengths of the two reflected electrical signals larger than λ/2, it is possible to significantly attenuate the intensity of at least one of the electrical signals necessary for interference and shift a phase relationship that causes the greatest interference. That is, this makes it possible to avoid the influence of the large reflected high-frequency signal that is most likely to match the phase and returns with the least attenuation, on the operation of the drive circuit element 17.

As shown in Equation (5), since |L1−L2| may be set to be greater than λ/2, the electrical length L1 does not necessarily need to be longer than the electrical length L2 as shown in FIG. 8 and may be shorter than the electrical length L2 as long as Equation (5) is satisfied.

3. Second Embodiment

Next, a second embodiment of the present invention will be described. The present embodiment is an optical transmission apparatus 60 equipped with the optical modulator 1 according to the first embodiment or the modification example of the first embodiment. FIG. 9 is a diagram illustrating a configuration of the optical transmission apparatus 60 according to the present embodiment. The optical transmission apparatus 60 includes an optical modulator 1, a light source 61, and a modulation signal generation part 62. The modulation signal generation part 62 is an electronic circuit that generates a high-frequency signal (modulation signal) for causing the optical modulator 1 to perform a modulation operation. The modulation signal generation part 62 inputs, to the optical modulator 1, for example, four modulation signals corresponding to the four signal electrodes 41 of the optical modulation device 3 included in the optical modulator 1 in the form of differential signals, based on transmission data given from the outside. In this way, the optical modulator 1 modulates light from the light source 61, which is input from the input optical fiber 6, and outputs the modulated light through the output optical fiber 7.

In the optical transmission apparatus 60 having the above configuration, the optical modulator 1 described above is used, so that by using, for example, an inexpensive differential signal output element manufactured for a semiconductor optical modulator as the drive circuit element 17, the entire apparatus can be configured at low cost, and stable optical modulation operation can be implemented with low power consumption, and the size of the optical transmission apparatus can be reduced.

4. Other Embodiments

The present invention is not limited to the configuration of the above embodiment and its alternative configuration, and can be implemented in various embodiments without departing from the gist of the present invention.

For example, the second termination resistor 18 that terminates the high-frequency signal that is not used for driving the optical modulation device 3 in the differential signal output by the drive circuit element 17 is mounted on the relay substrate 14 in the above-described embodiments, but may be provided inside the device, as in the drive circuit element 17-1 shown in FIG. 10. In this case, the second output port 51 is defined as not the output terminal of the drive circuit element 17, but as an output point 51-1 of the high-frequency signal output of the drive circuit included in the drive circuit element 17-1, and a configuration may be adopted in which a high-frequency transmission channel 52 is provided between the output point 51-1 and the second termination resistor 18.

Further, the drive circuit element 17 outputs the differential signal composed of two high-frequency signals whose phases are inverted from each other in the above-described embodiment, but the drive circuit element 17 may output a plurality of high-frequency signals having the same phase. Even in this case, when the optical modulation device 3 is driven by using a part of such a plurality of high-frequency signals, as in the above-described embodiment, the resistance value of the termination resistor for the high-frequency signal not used for driving the optical modulation device 3 is increased compared to the resistance value of the termination resistor for the high-frequency signal used for driving the optical modulation device 3, so that it is possible to reduce the power consumed as the high-frequency signal that is not used for driving the optical modulation device 3. Further, even in the case of a drive circuit element that outputs a plurality of high-frequency signals in phase, by configuring the signal electrode 41 as shown in the above-described embodiment and/or modification examples of the embodiment, it is possible to avoid the operation instability of the drive circuit element.

The above-described first embodiment and modification examples of the first embodiment and the above-described embodiments can be used in any combination as long as there is no conflict in the configuration. For example, an optical modulator may be configured by combining the first embodiment and all or any part of the above-described modification examples 2 to 7, or by combining modification example 1 and all or any part of the above-described modification examples 2 to 7.

5. Configuration Supported by Above Embodiments

The above embodiments and modification examples support the following configurations.

(Configuration 1) An optical modulator including: an optical waveguide device including an optical waveguide formed on a substrate and a signal electrode for controlling a light wave propagating through the optical waveguide; a drive circuit that outputs two high-frequency signals; and two termination resistors for respectively terminating the two high-frequency signals output from the drive circuit, in which one high-frequency signal out of the high-frequency signals output from the drive circuit propagates through the signal electrode of the optical waveguide device and is terminated by a first termination resistor that is one of the termination resistors, an other high-frequency signal out of the high-frequency signals output from the drive circuit is terminated by a second termination resistor that is an other one of the termination resistors, a resistance value of the first termination resistor is lower than a resistance value of the second termination resistor, and the signal electrode includes a plurality of sections having constant impedances different from each other.

According to the optical modulator of Configuration 1, by setting the resistance value of the first termination resistor to be smaller than the resistance value of the second termination resistor, more high-frequency power output from the drive circuit can be supplied to the signal electrode to reduce the power consumption of the drive circuit. Further, since the signal electrode is composed of a plurality of sections having constant impedances different from each other, a plurality of impedance discontinuity points are provided in the signal electrode, and the size of a reflected high-frequency signal generated at each impedance discontinuity point can be reduced. Therefore, in the optical modulator of Configuration 1, the size can be reduced by reducing the power consumption of the optical modulator while ensuring the stable operation of the optical modulation operation.

(Configuration 2) The optical modulator according to Configuration 1, in which the signal electrode includes at least three of the sections disposed such that impedances stepwise decrease along a propagation direction of the high-frequency signals of the signal electrode.

According to the optical modulator of Configuration 2, at least two impedance discontinuity points for changing the impedance in the decreasing direction can be secured inside the signal electrode, so that the size of a reflected high-frequency signal generated at each impedance discontinuity point can be reduced.

(Configuration 3) The optical modulator according to Configuration 1 or 2, in which at least one of the sections includes an action portion in which the high-frequency signal acts on the light wave propagating through the optical waveguide, and the section including the action portion is a lowest impedance section having a lowest impedance among the plurality of sections.

According to the optical modulator of Configuration 3, the interaction between the light wave propagating through the optical waveguide and the high-frequency signal propagating through the signal electrode can be further strengthened, and thus it is possible to further reduce the driving power required to cause the optical modulation device to perform the optical modulation operation.

(Configuration 4) The optical modulator according to any one of Configurations 1 to 3, in which a first electrical length of a lowest impedance section in a frequency band of the high-frequency signal, the lowest impedance section being a section having a lowest impedance among the plurality of sections, is longer than a second electrical length from a second output port that outputs the other high-frequency signal of the drive circuit to the second termination resistor in the frequency band.

According to the optical modulator of Configuration 4, with respect to the reflected high-frequency signal generated at the impedance discontinuity point at the downstream end portion of the lowest impedance section along the propagation direction of the high-frequency signals, the phase when the reflected high-frequency signal is input to the drive circuit is shifted from the phase of the reflected high-frequency signal generated at the second termination resistor and input to the second output port of the drive circuit, so that it is possible to more effectively reduce the operation instability of the driver circuit.

(Configuration 5) The optical modulator according to Configuration 4, in which the first electrical length of the lowest impedance section is longest among respective electrical lengths of the plurality of sections in the frequency band.

According to the optical modulator of Configuration 5, since the electrical length in the lowest impedance section is the longest, the reflected high-frequency signal generated at the impedance discontinuity point at the downstream end portion of the lowest impedance section attenuates greatly, and the phase of the reflected high-frequency signal input to the driver circuit is shifted from the phase of the reflected high-frequency signal input to the second output port, compared to the reflected high-frequency signal generated at the impedance discontinuity point. Therefore, according to the optical modulator of Configuration 5, the operation instability of the driver circuit can be further effectively reduced.

(Configuration 6) The optical modulator according to any one of Configurations 1 to 5, in which an attenuation portion that attenuates the high-frequency signal is provided between the drive circuit and the second termination resistor.

According to the optical modulator of Configuration 6, the reflected high-frequency signal generated in the second termination resistor is attenuated by the attenuation portion before reaching the second output port of the drive circuit, so that the operation instability of the drive circuit can be more effectively reduced.

(Configuration 7) The optical modulator according to any one of Configurations 1 to 6, in which a second electrical length from a second output port that outputs the other high-frequency signal of the drive circuit to the second termination resistor in a frequency band of the high-frequency signal is at least twice as long as a third electrical length from a first output port that outputs the one high-frequency signal of the drive circuit to the first termination resistor in the frequency band.

According to the optical modulator of Configuration 7, since the phase of the reflected high-frequency signal generated in the second termination resistor and back to the second output port of the drive circuit is shifted more than twice with respect to the phase of the reflected high-frequency signal generated in the first termination resistor and back to the first output port of the drive circuit, the operation instability of the drive circuit due to interference of these reflected high-frequency signals inside the drive circuit can be reduced.

(Configuration 8) The optical modulator according to any one of Configurations 1 to 6, in which an absolute value of a difference between a third electrical length L1 from a first output port that outputs the one high-frequency signal of the drive circuit to the first termination resistor in a frequency band of the high-frequency signal and a second electrical length L2 from a second output port that outputs the other high-frequency signal of the drive circuit to the second termination resistor in the frequency band of the high-frequency signal has a relationship of $|L1-L2|>\lambda/2$ with respect to an average wavelength $\lambda$ of the high-frequency signal.

According to the optical modulator of Configuration 8, by avoiding a state in which $|L1-L2|$ is equal to $\lambda/2$, that is, a state in which the phases of the two reflected high-frequency signals returning to the drive circuit are most likely to match each other, and the amount of attenuation received by these two reflected high-frequency signals before returning to the drive circuit is the smallest, it is possible to avoid these reflected high-frequency signals from affecting the operation of the drive circuit.

(Configuration 9) An optical transmission apparatus including: the optical modulator according to any one of Configurations 1 to 8; and an electronic circuit that generates a modulation signal which is a high-frequency signal for causing the optical waveguide device to perform a modulation operation.

According to the optical transmission apparatus of Configuration 9, since the optical modulator described in any one of Configurations 1 to 8 is used, the size can be reduced by implementing the stable operation of the optical modulation operation with low power consumption, while inexpensively configuring the entire apparatus.

What is claimed is:

1. An optical modulator comprising:
    an optical waveguide device including an optical waveguide formed on a substrate and a signal electrode for controlling a light wave propagating through the optical waveguide;
    a drive circuit that outputs two high-frequency signals; and
    two termination resistors for respectively terminating the two high-frequency signals output from the drive circuit, wherein
    one high-frequency signal out of the high-frequency signals output from the drive circuit propagates through the signal electrode of the optical waveguide device and is terminated by a first termination resistor that is one of the termination resistors,
    only the one high-frequency signal out of the high-frequency signals is configured to modulate the light wave propagating through the optical waveguide,
    an other high-frequency signal out of the high-frequency signals output from the drive circuit is terminated by a second termination resistor that is an other one of the termination resistors,
    a resistance value of the first termination resistor is lower than a resistance value of the second termination resistor, and
    the signal electrode includes a plurality of sections having constant impedances different from each other.

2. The optical modulator according to claim 1, wherein the signal electrode includes at least three of the sections disposed such that impedances stepwise decrease along a propagation direction of the high-frequency signals of the signal electrode.

3. The optical modulator according to claim 1, wherein at least one of the sections includes an action portion in which the high-frequency signal acts on the light wave propagating through the optical waveguide, and the section including the action portion is a lowest impedance section having a lowest impedance among the plurality of sections.

4. The optical modulator according to claim 1, wherein a first electrical length of a lowest impedance section in a frequency band of the high-frequency signal, the lowest impedance section being a section having a lowest impedance among the plurality of sections, is longer than a second electrical length from a second output port that outputs the other high-frequency signal of the drive circuit to the second termination resistor in the frequency band.

5. The optical modulator according to claim 4, wherein
the first electrical length of the lowest impedance section is longest among respective electrical lengths of the plurality of sections in the frequency band.

6. The optical modulator according to claim 1, wherein
an attenuation portion that attenuates the high-frequency signal is provided between the drive circuit and the second termination resistor.

7. The optical modulator according to claim 1, wherein
a second electrical length from a second output port that outputs the other high-frequency signal of the drive circuit to the second termination resistor in a frequency band of the high-frequency signal is at least twice as long as a third electrical length from a first output port that outputs the one high-frequency signal of the drive circuit to the first termination resistor in the frequency band.

8. The optical modulator according to claim 1, wherein
an absolute value of a difference between a third electrical length L1 from a first output port that outputs the one high-frequency signal of the drive circuit to the first termination resistor in a frequency band of the high-frequency signal and a second electrical length L2 from a second output port that outputs the other high-frequency signal of the drive circuit to the second termination resistor in the frequency band of the high-frequency signal has a relationship of $|L1-L2|>\lambda/2$ with respect to an average wavelength $\lambda$ of the high-frequency signal.

9. An optical transmission apparatus comprising:
the optical modulator according to claim 1; and
an electronic circuit that generates a modulation signal which is a high-frequency signal for causing the optical waveguide device to perform a modulation operation.

* * * * *